(12) United States Patent
Moran

(10) Patent No.: US 7,726,706 B2
(45) Date of Patent: Jun. 1, 2010

(54) LATCH MECHANISM FOR GATES AND THE LIKE

(75) Inventor: Eric M. Moran, Camano Island, WA (US)

(73) Assignee: Control Dynamics Inc., Everett, WA (US)

( * ) Notice: Subject to any disclaimer, the term of this patent is extended or adjusted under 35 U.S.C. 154(b) by 318 days.

(21) Appl. No.: 11/880,673

(22) Filed: Jul. 23, 2007

(65) Prior Publication Data

US 2007/0262589 A1 Nov. 15, 2007

Related U.S. Application Data

(63) Continuation-in-part of application No. 11/173,562, filed on Jul. 1, 2005, now Pat. No. 7,261,264, which is a continuation-in-part of application No. 10/996,551, filed on Nov. 23, 2004, now Pat. No. 7,077,372.

(51) Int. Cl.
*E05C 3/02* (2006.01)
*E05C 3/12* (2006.01)

(52) U.S. Cl. .................. 292/194; 292/230; 292/235; 292/236; 292/238; 292/341.15; 292/DIG. 29

(58) Field of Classification Search .............. 292/183, 292/184, 188, 189, 194, 230–239, 288, 341.15, 292/341.16, DIG. 29
See application file for complete search history.

(56) References Cited

U.S. PATENT DOCUMENTS

| 161,684 | A | * | 4/1875 | Hurd ........................... 292/189 |
| 665,034 | A | * | 1/1901 | Roots .......................... 292/238 |
| 780,481 | A | * | 1/1905 | Crawford ..................... 292/238 |
| 932,317 | A | * | 8/1909 | Pfiester .......................... 70/99 |
| 975,361 | A | * | 11/1910 | Johnson ....................... 292/238 |
| 1,015,338 | A | * | 1/1912 | Peel ............................. 292/57 |
| 1,256,992 | A | * | 2/1918 | Edgar et al .................. 292/167 |
| 1,262,435 | A | * | 4/1918 | Berg ....................... 292/341.16 |
| 1,358,885 | A | * | 11/1920 | Shimocuskies .............. 70/150 |
| 1,936,921 | A | * | 11/1933 | Strid .......................... 292/340 |

(Continued)

OTHER PUBLICATIONS

Allen-Bradley, Bulletin 700-HK "Skim Line" Relay, Cat. No. 700-HN122.

(Continued)

*Primary Examiner*—Carlos Lugo
(74) *Attorney, Agent, or Firm*—Graham & Dunn PC; Kathleen T. Petrich

(57) ABSTRACT

A latch mechanism for gates and the like for readily latching a slide bar to a locking unit. The locking unit has a block with a front and back plate that are fixedly attached to each other about portions of peripheries of the front and back plates that define an opening with a side slot and at least one adjacent top or bottom slot. Positioned within at least one top or bottom slot is at least one pivoting release lever having a first leg and a second leg movable about a pivot. One of the legs has a portion configured to engage a portion of a slide bar when restraining movement of the slide bar relative to the block. The other leg abuts and aids in dislodging the slide from the block when a force is applied to the pivoting lever. The latch mechanism further includes a slide bar guide.

21 Claims, 10 Drawing Sheets

U.S. PATENT DOCUMENTS

| | | | | |
|---|---|---|---|---|
| 2,437,403 | A * | 3/1948 | Rice | 292/341.15 |
| 2,575,465 | A * | 11/1951 | Patton | 292/78 |
| 2,647,003 | A * | 7/1953 | Way | 292/128 |
| 2,786,701 | A * | 3/1957 | Povlich | 292/144 |
| 3,265,423 | A * | 8/1966 | Berger | 292/67 |
| 3,265,425 | A * | 8/1966 | Berger | 292/202 |
| 3,600,021 | A * | 8/1971 | Hawkins | 292/167 |
| 3,919,869 | A * | 11/1975 | Fromm | 70/263 |
| 4,093,293 | A | 6/1978 | Huggett | |
| 4,109,949 | A * | 8/1978 | Smith | 292/189 |
| 4,486,042 | A | 12/1984 | Chee | |
| 4,660,793 | A | 4/1987 | Mark | |
| 4,720,611 | A | 1/1988 | Ishii | |
| 4,789,128 | A | 12/1988 | Yang | |
| 5,054,170 | A | 10/1991 | Otrusina | |
| 5,076,621 | A * | 12/1991 | Taylor et al. | 292/183 |
| 5,188,325 | A | 2/1993 | Hilty et al. | |
| 5,201,858 | A * | 4/1993 | Otrusina | 24/573.11 |
| 5,347,693 | A | 9/1994 | Otrusina | |
| 5,498,041 | A * | 3/1996 | Bezzerides et al. | 292/225 |
| 5,620,120 | A | 4/1997 | Tien | |
| 5,622,296 | A | 4/1997 | Pirhonen et al. | |
| 5,850,996 | A | 12/1998 | Liang | |
| 5,865,480 | A * | 2/1999 | Bain et al. | 292/67 |
| 6,059,156 | A | 5/2000 | Lehtinen | |
| 6,098,858 | A | 8/2000 | Laugesen | |
| 6,155,524 | A | 12/2000 | Legler et al. | |
| 6,189,489 | B1 | 2/2001 | Pearce | |
| 6,371,424 | B1 | 4/2002 | Shaw | |
| 6,808,212 | B1 * | 10/2004 | Hardee | 292/150 |
| 7,077,372 | B2 * | 7/2006 | Moran | 248/222.11 |
| 7,261,264 | B2 * | 8/2007 | Moran | 248/222.11 |
| 7,357,429 | B2 * | 4/2008 | Eichenauer | 292/144 |
| 2003/0062729 | A1 | 4/2003 | Ottens et al. | |
| 2005/0092801 | A1 | 5/2005 | Hicks et al. | |

OTHER PUBLICATIONS

Lion Country Supply, Nelson Model 1400 Dog Feeding Pan, 2004, Web site: lcsupply.com.

Lifespan Satin Stainless Steel Automatic Type Gate Latch and Lifespan Satin Stainless Steel Slide Bolt Latch, GateLatchUSA, 2007, Web site: gatelatchusa.com.

* cited by examiner

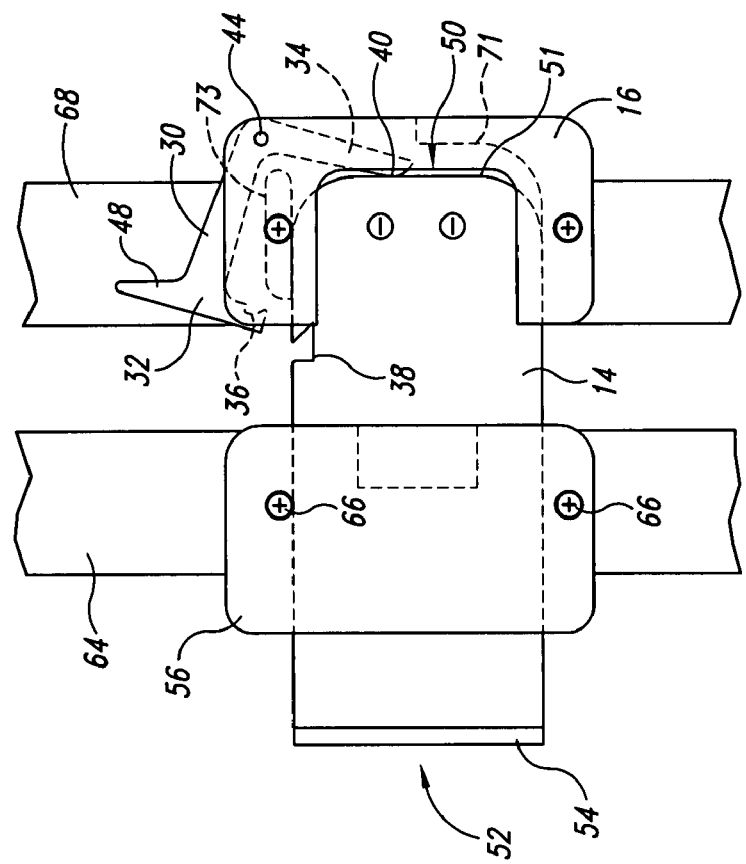
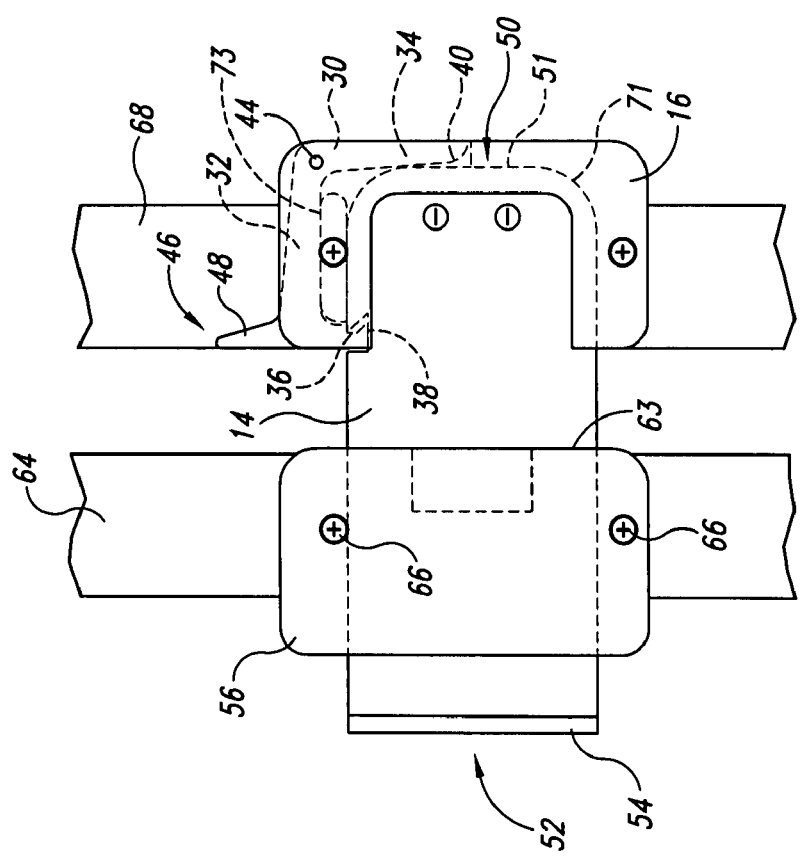

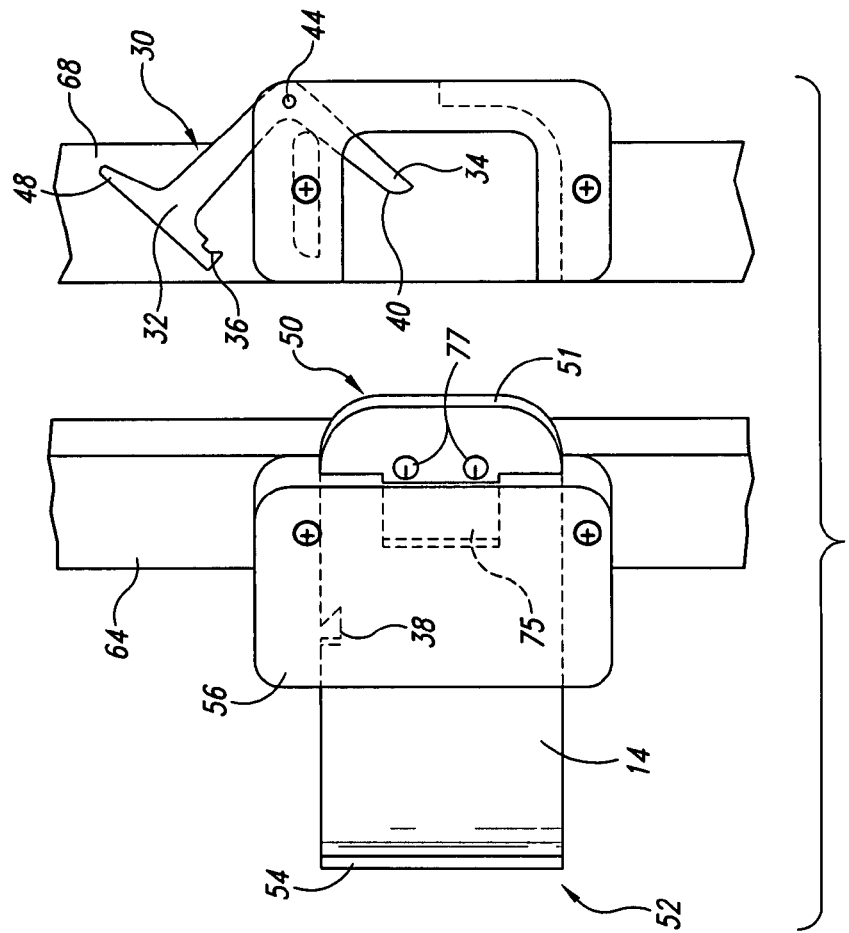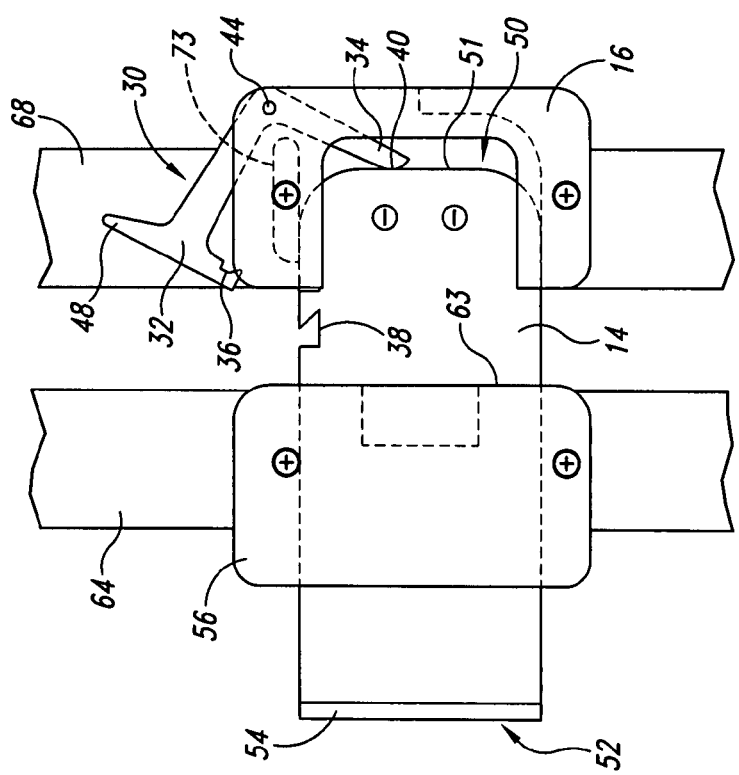

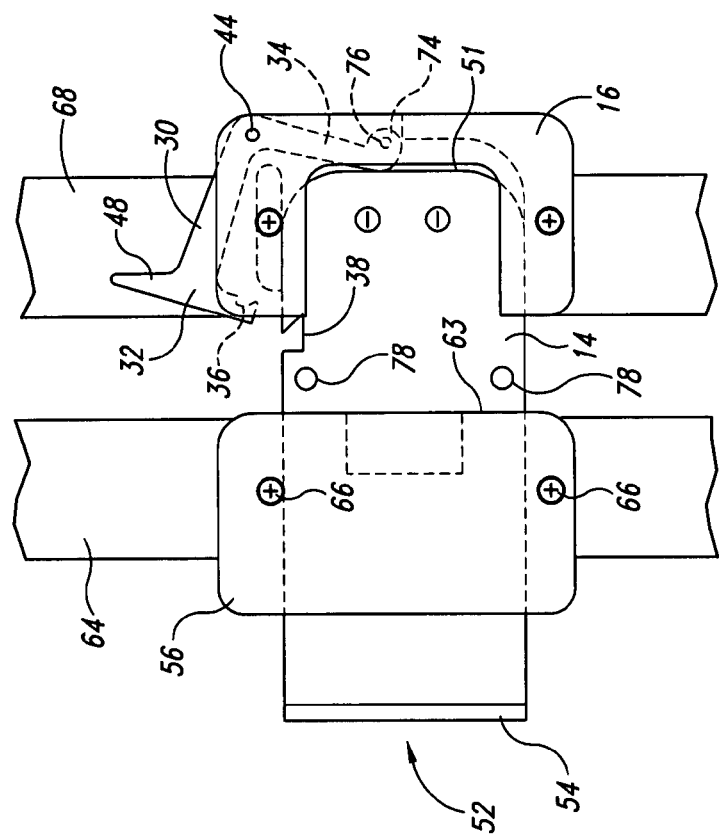
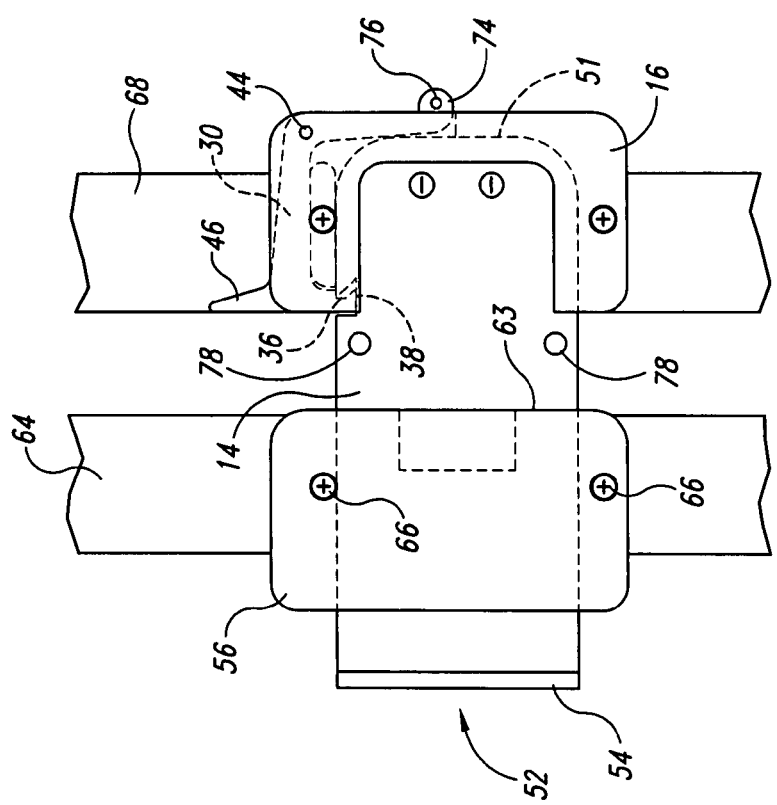
Fig. 5
Fig. 4

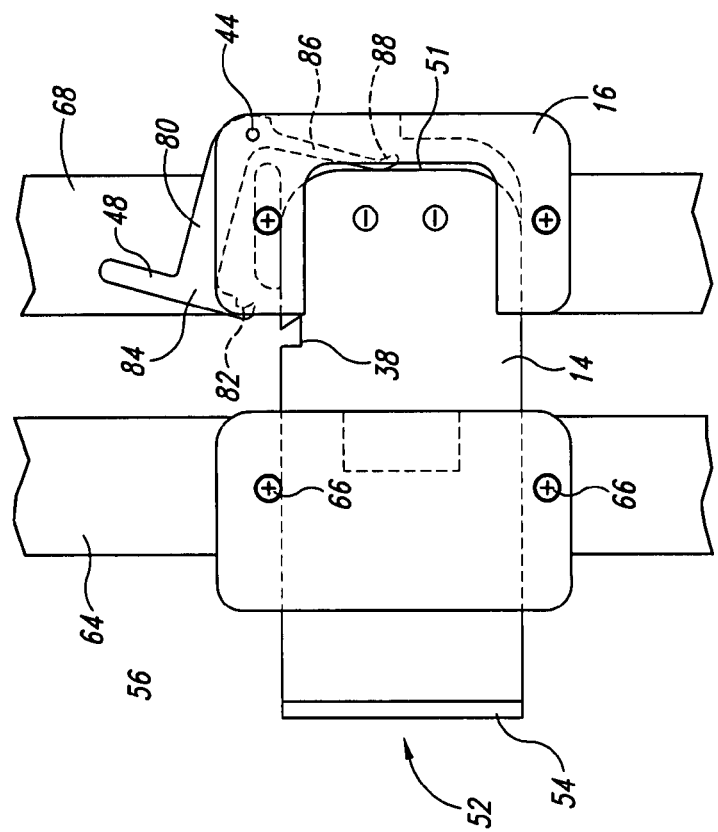
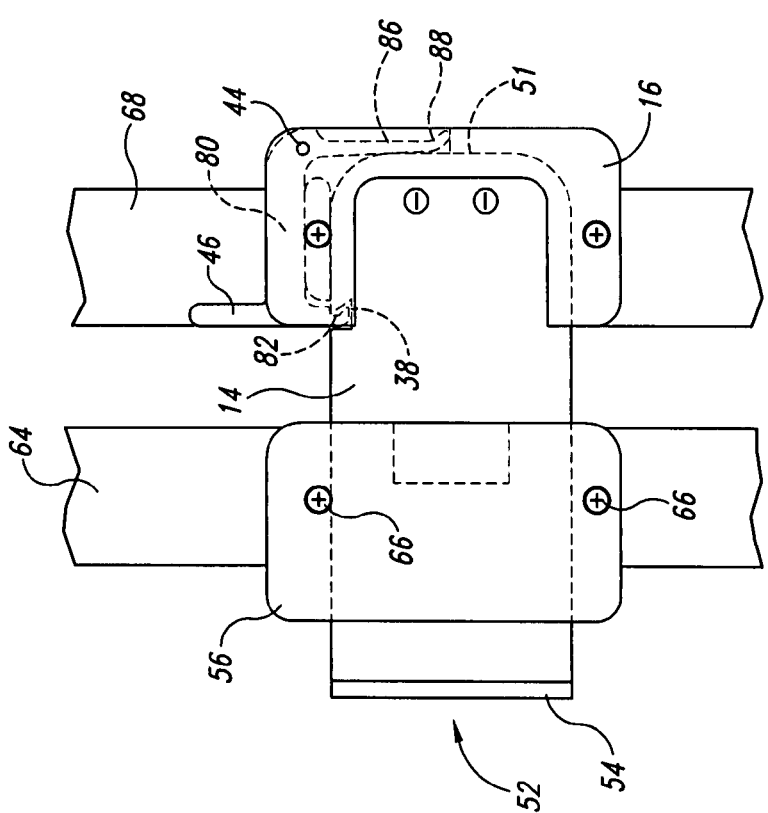

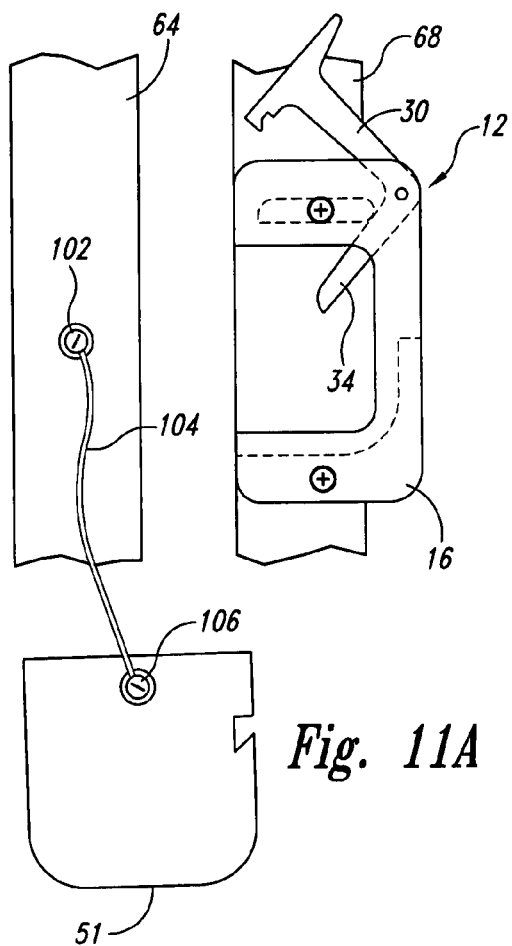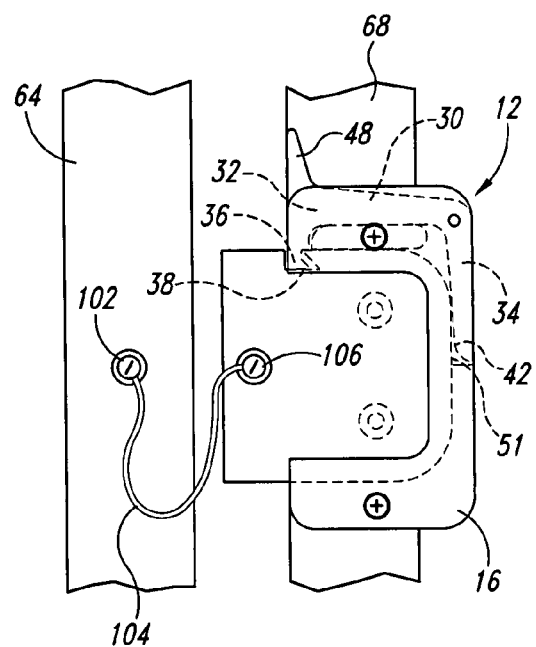
Fig. 11A
Fig. 11B
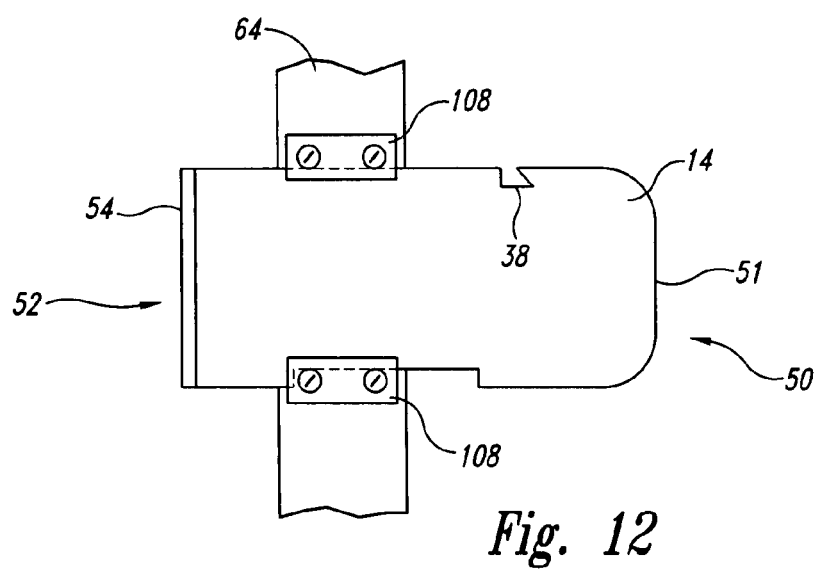
Fig. 12

LATCH MECHANISM FOR GATES AND THE LIKE

RELATED APPLICATIONS

The present application is a continuation-in-part of pending U.S. patent application Ser. No. 11/173,562 (Eric M. Moran, sole inventor, Control Dynamics, Inc., assignee), filed Jul. 1, 2005, entitled "Locking Assembly," which has matured to U.S. Pat. No. 7,261,264 issued Aug. 28, 2007, and which is a continuation-in-part of U.S. patent application Ser. No. 10/996,551 (Eric M. Moran, sole-inventor, Control Dynamics, assignee), filed Nov. 23, 2004, and entitled "Locking Assembly For Mounting a Device to a Solid Surface," which has matured to U.S. Pat. No. 7,077,372 issued Jul. 18, 2006.

TECHNICAL FIELD

The present invention relates generally to latch mechanisms, such as those used with gates, having slide bars. In particular, the present invention relates to a gate latch mechanism or assembly having a locking unit with a pivoting release lever for engaging a portion of a slide bar, along with a slide bar guide or stabilizer.

BACKGROUND OF THE INVENTION

Gate latch mechanisms have been well known for years. Examples are offered under the LIFESPAN trademark that typify a traditional gate latch assembly having a steel strike with a pivoting hook that attaches about a bar or a slide bolt latch and a mounting bracket. Further slide latch mechanisms have been known to attach a device to a surface, such as that found offered by Nelson for its 1400 Dog Feeding Pan, in which a dog pan is attached to a vertical surface (e.g., a wall). These latches typically provide a lot of "play" or "chatter" and lack either lateral stability or insufficient locking. Moreover, some latches are too easily dislodged by animals or small children when such dislodgement is not intended.

SUMMARY OF THE INVENTION

The present invention is directed to latch mechanism, for a gate and the like, that can lock a slide bar into a block and is sufficiently stabilized so that there is little play between the slide bar and the locking unit when in the locked mode. The latch mechanism includes a locking unit or block containing a pivoting release lever. This pivoting release lever is secured within the block and can rotate within the block. The block may be substantially like that described in my co-pending patent application U.S. Ser. No. 11/173,562. Each pivoting release lever has a first leg and second leg so that when the pivoting release lever is rotated, the first and second legs rotate and the second leg exerts a force on an end of the slide bar in order to dislodge the slide plate from the block.

The block includes a front plate and a back plate joined about portions of peripheries of the front and back plates to form an opening therebetween having a side slot and at least one adjacent top or bottom slot. Positioned within the opening in the at least one side slot is the at least one pivoting release lever having the afore-mentioned first leg and second leg joined together about a pivot. The pivot is attached to the front and back plates to allow the first and second legs rotational movement within the opening between the front and back plates about the pivot. The pivoting release lever further may include an outer knurled surface or a lever arm that can be readily accessed by human fingers in order to exert a desired force on the pivoting release lever to effectuate locking or dislodging action.

In the locked position, the leading edge of the first end portion of the slide bar is received endwise into the opening of the block thereby making contact with the second leg. When the second leg is fully biased against the end portion of the slide bar, the pivot action ceases and the first leg has an appendage that mates with a notch on the slide bar configured to receive the appendage.

To unlock and dislodge the slide bar from the block, a force is applied to the pivoting release lever and the second leg from the bracket assembly (and surface), which is preferably applied to the upper leg of the pivoting release lever via the outer surface of the pivoting release lever. The pivoting release lever moves the lower leg against the end portion of the slide bar to dislodge it from the block.

The latch mechanism of the present invention encompasses several embodiments. The latch mechanism may further include a guide block having a slot that can receive the first end of the slide bar and guides and restrains lateral movement of the slide bar relative to the locking unit. Other slide bar guides may be utilized, including rollers and guide rails or a dangling cord affixed to the closure.

The latching mechanism may also further include an appendage on the second leg that defines an aperture of a size and shape to engage an external lock, such as a padlock or other external restraint. At least one aperture may be placed on a portion of the slide bar itself to accommodate an external lock or other external restraint, as well.

The pivoting release lever may include a tapered second leg with a slightly outwardly flared end.

These and other advantages will become more apparent upon review of the Drawings, the Best Mode For Carrying Out the Invention, and the Claims.

BRIEF DESCRIPTION OF THE DRAWINGS

Like reference numerals are used to designate like parts throughout the several views of the drawings, wherein:

FIG. 2A is a front view of the assembled components of FIG. 1 but with the cover plate removed from the block and illustrated in the locked position with an appendage of the first leg of the pivoting release lever engaged with a notch on the slide bar;

FIG. 2B is a front view similar to FIG. 2A except that the pivoting release lever has begun to disengage from the notch on the slide bar and the second leg is pushing on the leading edge of the slide bar in order to dislodge it from the locking unit;

FIG. 2C is a front view similar to FIG. 2A except that the pivoting release lever is further pushing on the leading edge of the slide bar to complete dislodgement of the slide bar from the locking unit;

FIG. 2D is a front view similar to FIG. 2A except that the slide bar is fully dislodged and not in contact with the locking unit and the closure (e.g., gate) is shown ajar relative to the frame;

FIG. 4 is a view like FIG. 2A except illustrating an alternate embodiment in which the second leg includes an externally protruding appendage that defines an aperture of a size and shape to engage an external restraint (not shown), as well as apertures on the slide bar that can also engage an external restraint (also not shown);

FIG. 5 is a view like FIG. 4 except that the slide bar is shown being dislodged from the locking unit (similar to that of FIG. 2B);

FIG. 7 is a view like FIG. 2A except illustrating the pivoting release lever of FIG. 6;

FIG. 8 is a view like FIG. 2B except illustrating the pivoting release lever of FIG. 7;

FIGS. 11A and 11B are views like FIG. 9 illustrating yet another alternate embodiment of a slide bar guide in which the a fastener and a flexible member, such a cord, is attached to the second end of the slide bar; and FIG. 12 is a view like FIG. 9 illustrating a last alternate embodiment of a slide bar guide in which a pair of external guide blocks is mounted to the closure above and below the slide bar, respectively.

BEST MODE FOR CARRYING OUT THE INVENTION

Figure 1:
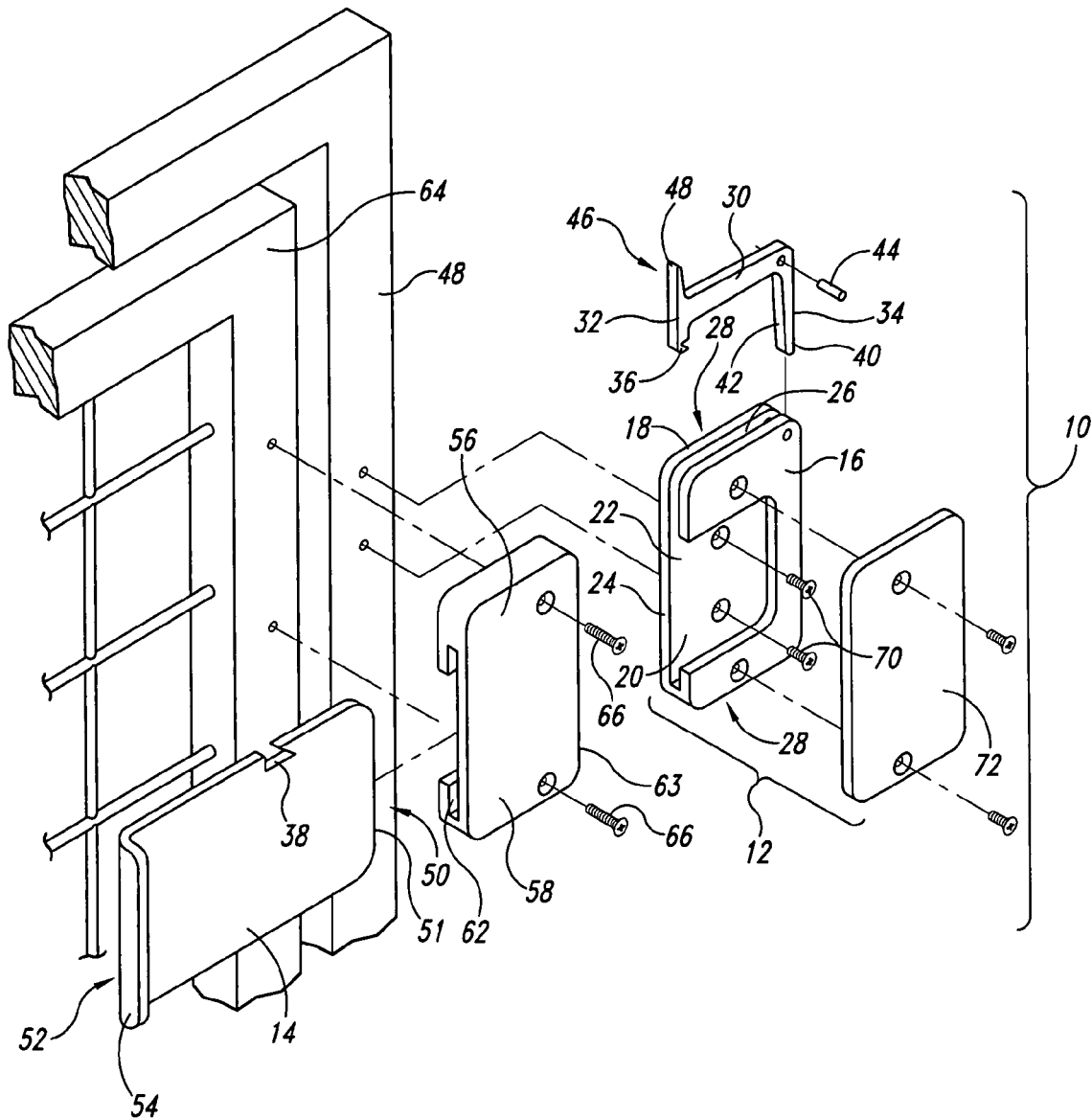
FIG. 1 is an exploded perspective view illustrating a first embodiment of the latch mechanism of the present invention including a locking unit having a pivoting release lever, a slide bar, and a guide block through which a leading edge of a first end portion of the slide bar may be received endwise and further showing the alignment of a back portion of the locking unit being mounted to a frame and a back portion of the guide block being affixable to a closure (such as a gate, as illustrated, or door)

The invention is directed to a latch mechanism for gates and the like that uses a locking unit that is substantially disclosed in the Applicant's co-pending U.S. patent application Ser. No. 11/173,562 (the '562 application) and entitled "Locking Assembly." However, unlike attaching a device to a surface through a locking assembly, the present invention engages, locks, and readily dislodges an end portion of a slide bar with little lateral play or chatter when locked to the locking unit and in which the locking unit is affixed to a frame or closure and the slide bar or slide bar guide is affixed to the other component (frame or closure) in order to latch the frame to the closure. The invention not only easily attaches and detaches the slide bar to the locking unit, but includes improvements not fully appreciated in Applicant's prior co-pending '562 application, which is incorporated into the present application by reference.

Referring to FIGS. 1-5, the locking assembly 10 of the first embodiment includes a locking unit 12 and a slide bar 14. The locking unit or block 12 includes a front plate 16 and a back plate 18 that may be substantially rectangular in shape. The front and back plates 16, 18 are conjoined or otherwise affixed at portions of their peripheries and spaced apart in such a way as to form a substantially continuous opening 20 therebetween. Opening 20 forms a side slot 22 at the side 24 of block 12 and at least one top slot 26 on either the top or bottom 28 of the block.

Positioned within opening 20 and between the front and back plates 16, 18 is a pivoting release lever 30 having a first leg 32 and a second leg 34. The first leg includes an appendage 36 of a size and shape to engage a corresponding notch 38 on slide bar 14. The second leg 34 includes an end portion 40 that includes an exterior surface 42. The pivoting release lever pivots within the opening between the front and back plates about a pivot 44.

The pivoting release lever further includes an engageable surface 46, such as a lever arm 48 as illustrated, in which an external force may be applied to move the pivoting release lever in rotational movement within the opening between the front and back plates. As an alternate to a lever arm 48, the engageable surface 46 may be a knurled curved exterior such as that disclosed in the afore-mentioned co-pending '562 application.

The slide bar 14 further includes a first end 50 having a leading edge 51 that is of a size and shape to be received endwise into the opening of the block 12 through side slot 22. Opposite the first end is a second end 52 that may include an externally extending rim 54 that is easily engaged by human fingers. Alternatively, a handle or other projection may be added to second end 52.

The latch mechanism 10 further includes a slide guide that guides and aids in restraining the slide bar from lateral movement relative to the block. While there are several embodiments of the slide guide discussed in more detail below, a first embodiment guide block 56 is illustrated in FIGS. 1-5 having a front plate 58 and back plate 60 that are joined and define a slot 62 of a size and shape to fully receive the first end 50 of slide bar 14. The guide block 56 may be essentially rectangular in shape, similar in overall size as block 12. Guide block 56 has a leading edge 63.

In use, the back plate 60 of the guide block 56 is affixed to a frame or closure (e.g., a gate, which is illustrated at 64, or a door), such as by fasteners 66, and the back plate 18 of block 12 is affixed to the other component (in FIG. 1, back plate 18 is affixed to the frame 68) through other fastening means such as fasteners 70. The first end 50 of slide bar 14 is inserted through slot 62 of guide block 56 and into the opening 20 of block 12 until the leading edge 51 of the slide block 14 is retrained by the second leg 34 the pivoting release lever 30 and an optional abutment 71 formed within block 12. The block 12 may further include an optional cover plate 72 that is external of the front plate 16 of block 12 and provides added security to the integrity of the locking function of the invention in that the leading edge of the slide bar and portions of the pivoting release lever are not readily accessible once they are in the locked position.

Now referring particularly to FIGS. 2A-2E, the leading edge 51 of the slide bar 14 makes mating contact with the block through opening 20 until it can push no further on the second leg 34 of the pivoting release lever 30 and abutment 71. While the slide bar applies a pressure to the second leg and moves it backward, the first leg rotates around the top portion of the slide bar. The first leg 32 of the pivoting release lever 30 is then positioned such that the appendage 36 of the first leg 32 mates with the notch 38 on slide bar 14. An optional abutment 73 may be added to block 12 in order to assist in restraining the first leg 32 from movement past a certain rotational point to more accurately and elegantly engage the notch on slide bar 14. Thus, the guide block 56 and pivoting release lever 30 further restrains lateral movement of the slide bar 14. The gate (closure 64) and the frame 68 are now latched (FIG. 2A) until an external force is applied to the pivoting release lever as shown in FIGS. 2B-2E.

In FIGS. 2B-2D, an external force is applied to lever arm 48 of pivoting release lever 30, which simultaneously breaks the mating relationship between the appendage 36 of the first leg 32 and the notch 38 of the slide bar and rotates the second leg to apply a force to the leading edge 51 of the slide bar 14. The more force is applied to the lever arm 48, the more the second leg 34, and particularly surface 42, applies a force to leading edge 51 of slide bar 14 in order to dislodge the slide bar from block 12. This is best illustrated in FIGS. 2B and 2C.

Figure 2E:
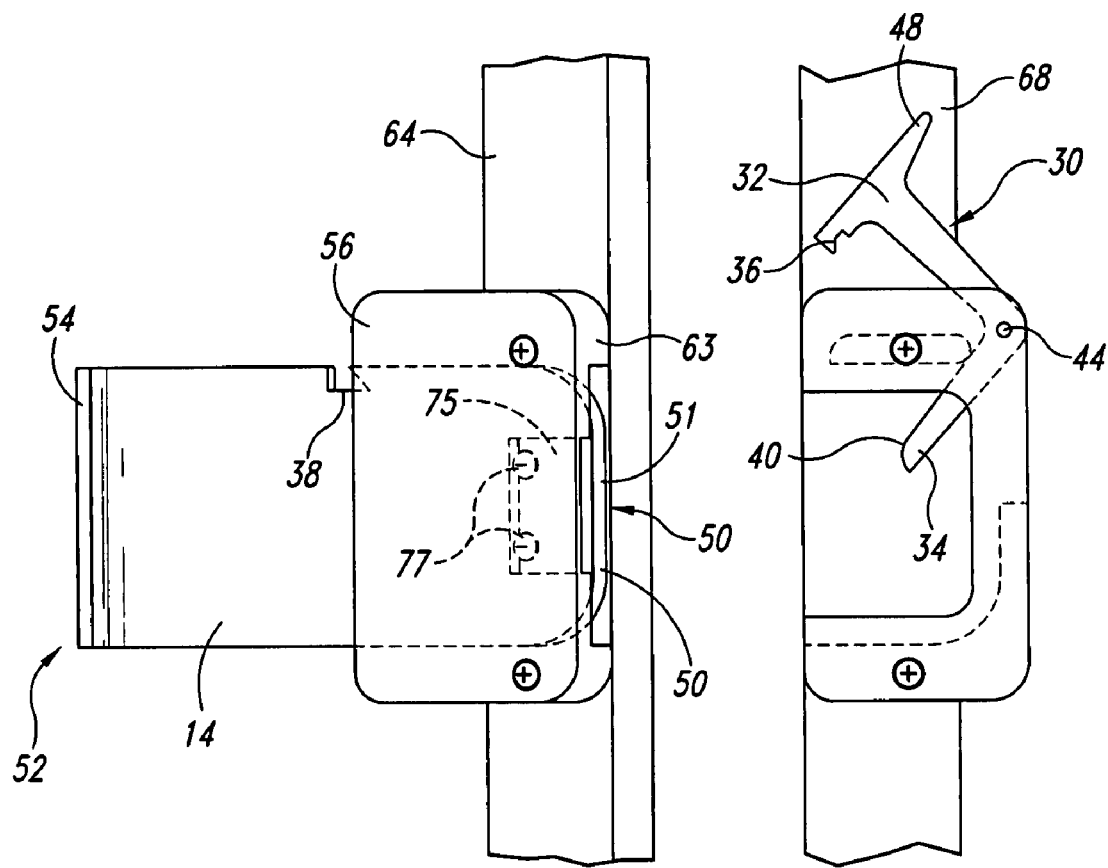
FIG. 2E is a front view similar to FIG. 2A, except that the slide bar is illustrated fully retracted in the first embodiment with the closure (e.g., gate) shown slightly ajar and that the slide bar is restrained from further lateral movement relative to the guide block such that the leading edge of the slide bar is essentially flush with the leading edge of the guide block.
Figure 3:
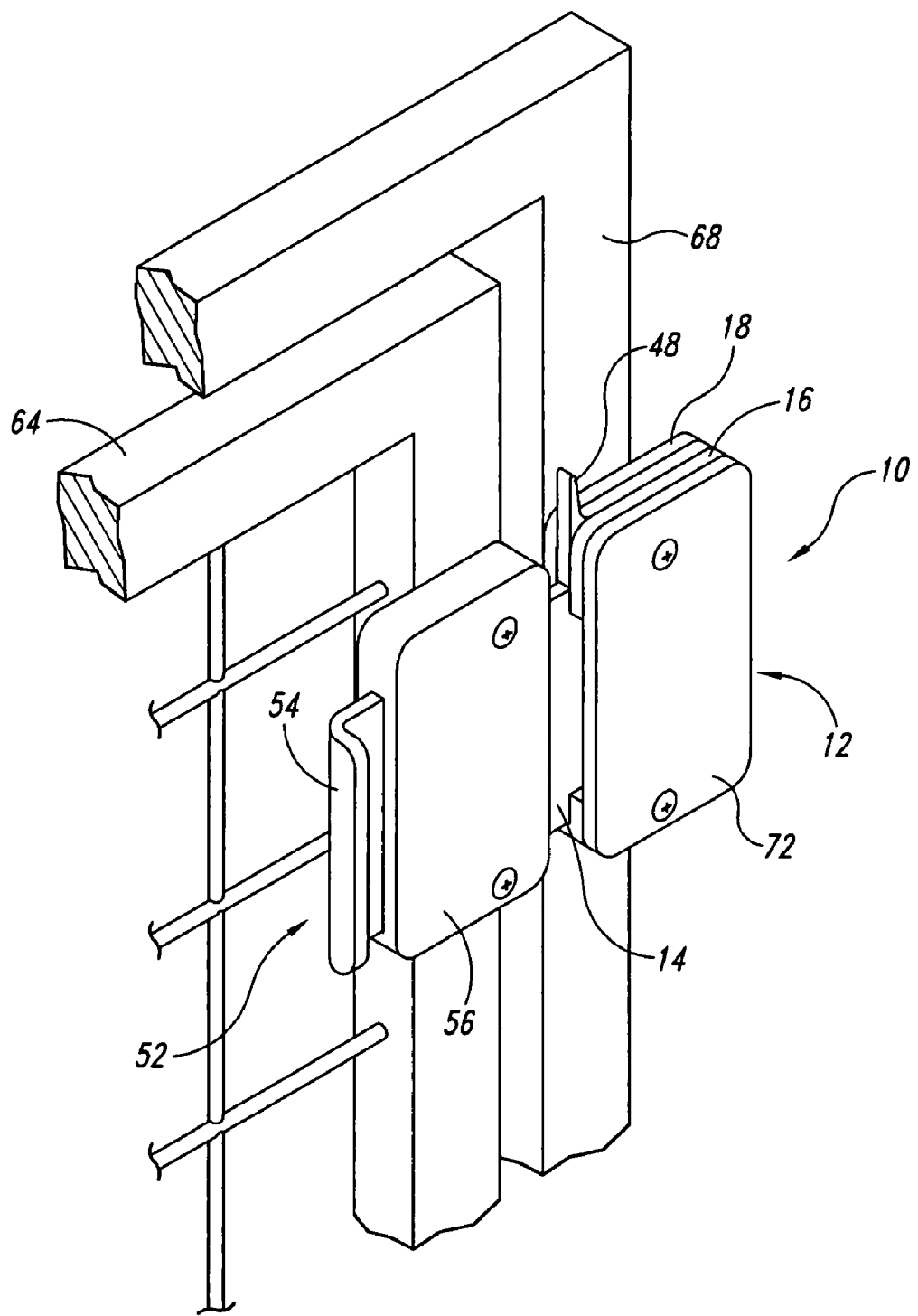
FIG. 3 is a front perspective view of the latch mechanism of the first embodiment in the fully closed and locked position relative to the frame and closure (e.g., gate)

At some point, the slide bar is fully dislodged from the block 12 (FIGS. 2D and 2E). In FIG. 2D the slide bar has not fully been pushed back to its full extension and the gate is no longer latched and may be opened.

The invention further includes an optional restraint to keep the slide bar inherently joined to guide block 56 through a slot or groove 75 or pair of slots or groves milled or otherwise formed within the guide block that can receive a detent 77 or pair of detents (as illustrated) on the end portion 50 of slide bar 14. The slot and detent keeps the slide bar from fully be removed from the guide block. In this way, the latch mechanism cannot be unintentionally relocked. Further, and as best illustrated in FIG. 2E, the position of the slot and detent on the guide block and slide bar allows the leading edge 51 of the slide bar 14 to be essentially flush with the leading edge 63 of the guide block 56. The essentially flush arrangement of the guide block and slide bar makes is difficult to harm users/objects when passing through the closure and frame. Furthermore, having an essentially flush surface makes it less likely to catch on clothing and the like.

Now referring particularly to FIGS. 4 and 5, the present invention may include the ability to engage other external restraints, such as a padlock (not illustrated). Pivoting release lever 30 may include an externally protruding appendage 74 affixed to its second leg 34 that defines an aperture 76 of a size and shape to receive an external locking device, such as a padlock or pin. Further, slide bar 14 may include at least one aperture 78 near its top or bottom edges to engage an external lock or other restraint.

Figure 6:
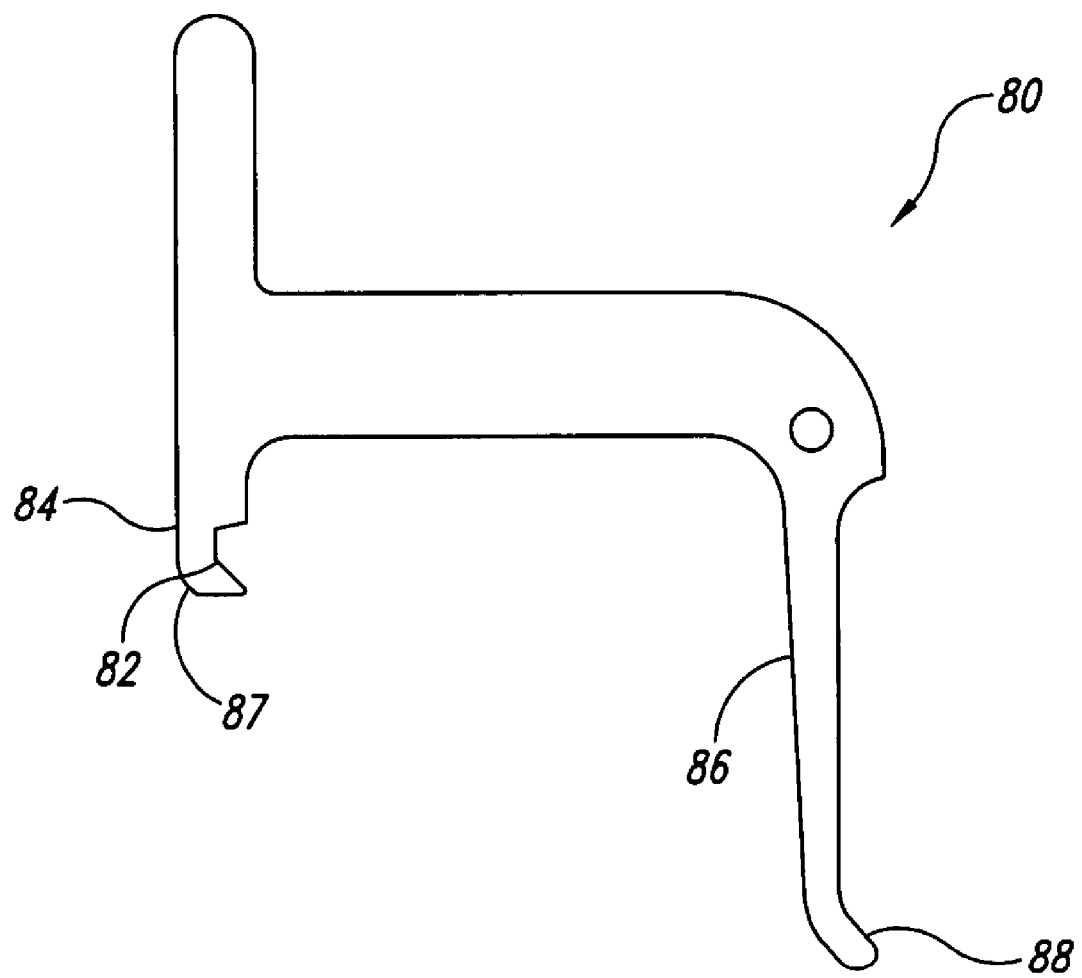
FIG. 6 is a front view similar of another alternate embodiment of the pivoting release lever.

FIGS. 6-8 illustrate another alternate embodiment pivot release arm 80 that has a more pronounced hook-like appendage 82 of first leg 84 and a tapered second leg 86 with a slightly flared end surface 88. Appendage 82 may include a curved outer radius 87 or a chamfered corner to more easily engage notch 38 on slide bar 14. While the latch mechanism can be used omnidirectionally, the tapered hooked second leg 86 and flared outer service 88 makes the latch mechanism work better in the upside down position.

Figure 9:
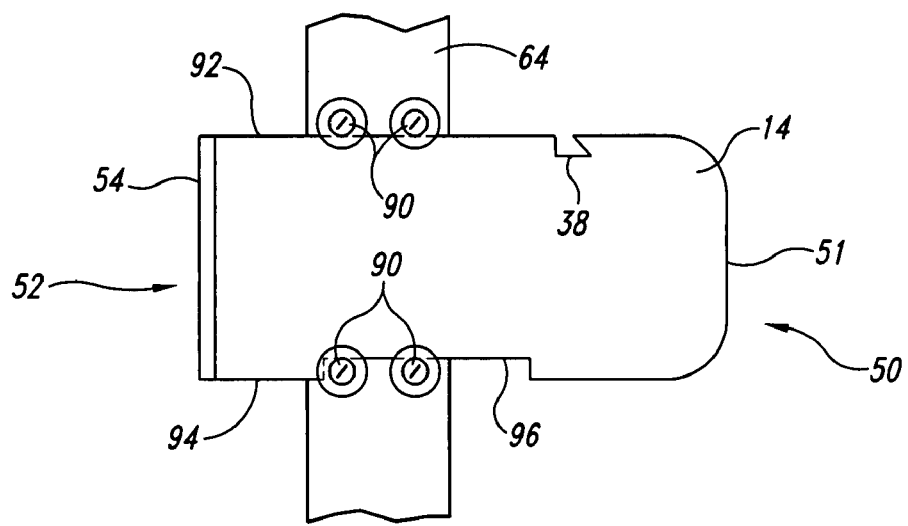
FIG. 9 is a front view of the slide bar of FIG. 1 but illustrated with an alternate embodiment slide bar guide having a pair of rollers external of the top and bottom of the slide bar and in which the rollers are mounted to the closure.

FIGS. 9-12 illustrate alternate embodiment slide guides in lieu of guide block 56. FIG. 9 discloses a pair of rollers 90 mounted to the closure 64 such that the top and bottom edges 92, 94 of the slide bar are abutted by a portion of the rollers 90. In a further refinement, bottom edge 94 of slide bar 14 may include a longitudinal slot 96 in which the bottom rollers engage and cause a natural lateral guide and restraint.

Figure 10:
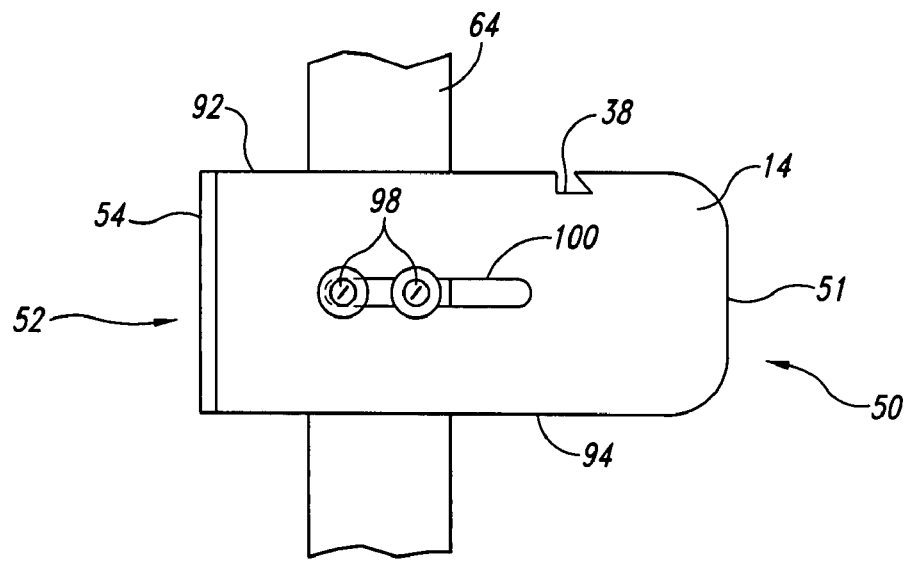
FIG. 10 is a view like FIG. 9 illustrating yet another alternate embodiment of a slide bar guide in which the slide bar guide is a pair of internal rollers that are mounted to the closure within a longitudinal slot defined within the slide bar.

FIG. 10 illustrates a similar lateral restraint and guide as that of FIG. 9, except that the rollers 98 are positioned within a longitudinal slot 100 of slide bar 14. Rollers 98 would be mounted or otherwise affixed to closure 64.

FIGS. 11A and 11B illustrate a different restraint/guide in which at least one post or fastener 102 is mounted to the closure 64 and a cord 104 or other flexible member (e.g., rope, string, wire chain) is affixed to second end 52 of the slide bar, such as through a complementary post or fastener 106. In this embodiment, the slide bar length may be shortened from the embodiments illustrated in FIGS. 1-10.

Last, FIG. 12 illustrates an embodiment similar to that of FIG. 9, but where the rollers are replaced by a pair of guide blocks 108.

The present invention may include another pivoting release lever (for double engaging action) similar to the block described in FIG. 24 of Applicant's afore-mentioned '562 application. The slide bar can then have two notches on opposite ends of each other.

The present invention or individual components of the invention may be made from metal, e.g., stainless steel or aluminum or other alloy, or man-made materials. The block and guide block may be manufactured such that the front and back plates are unitarily formed. In addition to application for gates or kennels, the present latch mechanism can be readily adapted for marine, automotive, cabinetry, and general industrial uses.

As discussed above, the latch mechanism may be used omnidirectionally. Thus, the terms "top," "side," and "bottom," are used relatively (as viewed in relationship to the drawings) and not intended to be per se limiting.

Advantages of the present invention include an easily latched and dislodged mechanism in which the locking/dislodging action is accomplished through a single motion defined by the pivoting release lever. The latch mechanism of the present invention requires no complicated stored energy mechanism. The illustrated embodiments are only examples of the present invention and, therefore, are non-limitive. It is to be understood that many changes in the particular structure, materials, and features of the invention may be made without departing from the spirit and scope of the invention. Therefore, it is the Applicant's intention that his patent rights not be limited by the particular embodiments illustrated and described herein, but rather by the following claims interpreted according to accepted doctrines of claim interpretation, including the Doctrine of Equivalents and Reversal of Parts.

What is claimed is:

1. A latch mechanism comprising:
   a locking unit having a front plate and a back plate spaced apart and fixedly attached to each other about portions of peripheries of the front and back plates to form an opening therebetween having a side slot and top and bottom adjacent slots;
   a pivoting release lever positioned within the adjacent slots between the front and back plates of the bracket assembly, said pivoting release lever having a first leg and a second leg interconnected by a pivot that is attached to the front and back plates of the bracket assembly such that the pivoting release lever can pivot within the opening between the front and back plates about the pivot between a locked and dislodged position; said pivoting release lever further having a protruding arm that can be engaged to transfer an external force in order to cause pivoting movement of the pivoting release lever;
   a slide bar having a first end portion with a leading edge and a second end portion and with top and bottom portions therebetween, said leading edge of the first end portion can be received endwise into the opening between the front and back plates to make contact with said first leg to make said pivoting release lever to allow further intersection of said slide bar, said slide bar further having a notch that is configured to receive a corresponding appendage on the first leg of the pivoting release lever in the locked position and said first end portion can be abutted by a portion of the second leg of the pivoting release lever when the an external force is applied to the pivoting release lever in order to dislodge the slide bar relative to the locking unit; and a slide bar guide to guide said slide bar movement.

2. The latch mechanism according to claim 1 wherein the slide bar guide is a separate guide block having a leading edge, said guide block further includes a slot that extends from a first end to a second end and is of a size and shape to fully receive endwise the first end portion of the slide bar and to restrain lateral movement of the slide bar relative to the guide block when the slide bar is inserted endwise into the slot.

3. The latch mechanism according to claim 1 wherein the first leg of the pivoting release lever has a hook that mates with the notch on the slide bar.

4. The latch mechanism according to claim 1 wherein the second leg further includes a protrusion that defines an opening of a size and shape to engage an external restraint.

5. The latch mechanism according to claim 1 wherein the slide bar further includes at least one aperture of a size and shape to engage an external restraint.

6. The latch mechanism according to claim 1 wherein the second leg tapers past the pivot.

7. The latch mechanism according to claim 1 wherein the pivoting release lever excludes a release lever adjacent and opposite the first leg.

8. The latch mechanism according to claim 2 wherein the first leg of the pivoting release lever has a hook that mates with the notch on the slide bar.

9. The latch mechanism according to claim 2 wherein the guide block includes a slot in which to receive a detent on the first end portion of the slide bar.

10. The latch mechanism according to claim 9 wherein the detent and slot are configured to restrain lateral movement of the slide bar in the dislodge mode such that the leading edge of the guide block and leading edge of the slide bar are essentially flush.

11. The latch mechanism according to claim 8 wherein the guide block includes a slot in which to receive a detent on the first end portion of the slide bar and wherein the detent and slot are configured to restrain lateral movement of the slide bar in the dislodge mode such that the leading edge of the guide block and leading edge of the slide bar are essentially flush.

12. The latch mechanism according to claim 3 wherein the second leg tapers past the pivot.

13. The latch mechanism according to claim 1 wherein the locking unit further includes a cover plate that is affixed to the front plate.

14. The latch mechanism according to claim 1 wherein a second end of the slide bar includes an outwardly curved end.

15. The latch mechanism according to claim 2 wherein fasteners are used to affix the back plate of the locking unit and the back of the guide block to a frame and a closure, respectively.

16. The latch mechanism according to claim 1 wherein the slide bar guide is two pairs of rollers mounted to a closure approximately the lateral distance of the slide bar and wherein one pair of the rollers engages the top portion of the slide bar and the other pair of rollers engages the bottom portion of the slide bar.

17. The latch mechanism according to claim 1 where in the slide bar guide is a pair of rollers mounted to a closure within a longitudinal slot of the slide bar.

18. The latch mechanism according to claim 1 wherein the slide bar guide is pair of spaced apart blocks mounted to a closure approximately the lateral distance of the slide bar and wherein one of the blocks engages the top portion of the slide bar and the other block engages the bottom portion of the slide bar.

19. A latch mechanism comprising:

a locking unit having a front plate and a back plate spaced apart and fixedly attached to each other about portions of peripheries of the front and back plates to form an opening therebetween having a side slot and top and bottom adjacent slots;

a pivoting release lever positioned within the adjacent slots between the front and back plates of the bracket assembly, said pivoting release lever having a first leg and a second leg interconnected by a pivot that is attached to the front and back plates of the bracket assembly such that the pivoting release lever can pivot within the opening between the front and back plates about the pivot between a locked and dislodged position; said pivoting release lever further having protrusion extending outwardly from a surface of said pivoting release lever that can be engaged to provide an external force in order to cause pivoting movement of the pivoting release lever;

a slide bar having a first end portion that can be received endwise into the opening between the front and back plates to make contact with said first leg to make said pivoting release lever to allow further insertion of said slide bar, said slide bar further having a notch that is configured to receive a corresponding appendage on the first leg of the pivoting release lever in the locked position and said first end portion can be abutted by the a portion of the second leg of the pivoting release lever when the an external force is applied to the pivoting release lever in order to dislodge the slide bar relative to the locking unit; and slide bar guide means to limit lateral movement of the slide bar when the slide bar is in the locked mode.

20. A method of latching a frame to a closure comprising:

providing a locking unit that is affixed to a frame, said locking unit including a front plate and a back plate spaced apart and fixedly attached to each other about portions of peripheries of the front and back plates to form an opening therebetween having a side slot and top and bottom adjacent slots;

providing pivoting release lever positioned within the adjacent slots between the front and back plates of the bracket assembly, said pivoting release lever having a first leg and a second leg interconnected by a pivot that is attached to the front and back plates of the bracket assembly such that the pivoting release lever can pivot within the opening between the front and back plates about the pivot between a locked and dislodged position; said pivoting release lever further having an arm extending outwardly from a surface of said pivoting release lever that can be engaged to provide an external force in order to cause pivoting movement of the pivoting release lever;

providing a slide bar having a first end portion that can be received endwise into the opening between the front and back plates, said slide bar further having a notch that is configured to receive a corresponding appendage on the first leg of the pivoting release lever;

providing a guide block that is affixed to the closure; and moving the slide bar such that the end portion is received the through the slot in the guide block and into the opening of the locking unit such that the end portion makes contact with said first leg to make said pivoting release lever to allow further insertion of said slide bar, further insertion of said slide bar will make said end portion to abut the second end of the pivoting release lever to make said pivoting release lever to pivot and move said first leg toward said sliding bar so that the appendage of the first leg can engage the notch on the slide bar and secure said frame to said closure.

21. A method of latching a frame to a closure comprising:

providing a locking unit having a pivoting arm that is adapted to lockingly engage; said locking unit including a front plate and a back plate spaced apart and fixedly attached to each other about portions of peripheries of the front and back plates to form an opening therebetween having a side slot and top and bottom adjacent slots, and a pivoting release lever positioned within the adjacent slots between the front and back plates of the bracket assembly, said pivoting release lever having a first leg and a second leg interconnected by a pivot that is attached to the front and back plates of the bracket assembly such that the pivoting release lever can pivot within the opening between the front and back plates about the pivot between a locked and dislodged position; said pivoting release lever further having an arm extending outwardly from a surface of said pivoting release lever that can be engaged to provide an external force in order to cause pivoting movement of the pivoting release lever; said locking unit being connectedly attached to either a frame or an adjacent closure;

providing a slide bar wherein at least an end portion of said slide bar is adapted to lockingly engage at least a portion of the pivoting arm and further wherein said slide bar further includes a notch that is configured to receive a corresponding appendage on the first leg of the pivoting release lever;

providing guiding means to connectedly attach the slide bar to the frame or the closure, whichever one the locking means is not connectedly attached to, and wherein the guiding means aligns and guides movement of the slide bar relative to the locking unit;

sliding the slide bar such that at least the end portion of the slide bar is in locking engagement with the pivoting arm of the locking unit when latching the closure to the frame is desired; wherein the end portion of the slide bar makes contact with said first leg to make said pivoting release lever to allow further insertion of said slide bar, further insertion of said slide bar will make said end portion to abut the second end of the pivoting release lever to make said pivoting release lever to pivot and move said first leg toward said sliding bar so that the appendage of the first leg can engage the notch on the slide bar and secure said frame to said closure.

* * * * *